(12) United States Patent
Podgorny et al.

(10) Patent No.: US 10,496,637 B2
(45) Date of Patent: Dec. 3, 2019

(54) METHOD AND SYSTEM FOR PERSONALIZING SOFTWARE BASED ON REAL TIME TRACKING OF VOICE-OF-CUSTOMER FEEDBACK

(71) Applicant: INTUIT INC., Mountain View, CA (US)

(72) Inventors: Igor A. Podgorny, Mountain View, CA (US); Warren Bartolome, Mountain View, CA (US); Kelvin Hung, Mountain View, CA (US); Benjamin Indyk, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 282 days.

(21) Appl. No.: 15/044,783

(22) Filed: Feb. 16, 2016

(65) Prior Publication Data

US 2017/0235789 A1    Aug. 17, 2017

(51) Int. Cl.
| | |
|---|---|
| *G06F 17/30* | (2006.01) |
| *G06F 16/242* | (2019.01) |
| *G06N 7/00* | (2006.01) |
| *G06F 16/332* | (2019.01) |
| *G06N 20/00* | (2019.01) |
| *G06F 3/16* | (2006.01) |

(52) U.S. Cl.
CPC ...... *G06F 16/2423* (2019.01); *G06F 16/3325* (2019.01); *G06N 7/005* (2013.01); *G06N 20/00* (2019.01); *G06F 3/167* (2013.01)

(58) Field of Classification Search
USPC ............... 707/609, 687, 705, 790, 813, 821
See application file for complete search history.

(56) References Cited

U.S. PATENT DOCUMENTS

| | | | |
|---|---|---|---|
| 9,009,096 B2 | 4/2015 | Pinckney et al. | |
| 9,087,106 B2 | 7/2015 | Zheng et al. | |
| 9,110,764 B2 | 8/2015 | Ding et al. | |
| 2001/0025138 A1* | 9/2001 | Bardy | A61B 5/0006 600/300 |
| 2007/0160054 A1* | 7/2007 | Shaffer | H04M 3/5175 370/395.2 |
| 2008/0027924 A1* | 1/2008 | Hamilton | G06F 16/9535 |
| 2015/0261853 A1 | 9/2015 | Shao | |
| 2015/0347581 A1 | 12/2015 | Kamotsky | |
| 2016/0034514 A1* | 2/2016 | Singhal | G06F 16/9535 707/706 |

OTHER PUBLICATIONS

International Search Report and Written Opinion dated May 1, 2017 for Application No. PCT/US2017/016693.

* cited by examiner

*Primary Examiner* — Sana A Al-Hashemi
(74) *Attorney, Agent, or Firm* — Patterson + Sheridan, LLP (57) ABSTRACT

Techniques are disclosed for dynamically personalizing application content presented to a user based on "voice-of-customer" feedback, in real-time. As described, the user may provide voice-of-customer feedback characterizing an initial selection of application content presented to the user may be evaluated to identify a set of topics referenced by the voice-of-customer feedback. Keywords associated with the identified topics may be used to enhance the selection of application content presented to the user. For example, keywords associated with the identified topics may be added to an initial search query composed by the user. Doing so can improve the relevance or helpfulness of information content or software interfaces identified using the query.

25 Claims, 8 Drawing Sheets

METHOD AND SYSTEM FOR PERSONALIZING SOFTWARE BASED ON REAL TIME TRACKING OF VOICE-OF-CUSTOMER FEEDBACK

FIELD

The present disclosure relates to techniques for personalizing computer software and user interface content in real-time based on feedback from users.

DESCRIPTION OF RELATED ART

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance.

In addition to these primarily transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Service providers often publish help content, user guides, and other documentation to assist users in accomplishing a given task, explain a given feature, or describe information related to the service (e.g., the requirements a user must satisfy to qualify for a given tax credit or the consequences of different choices or elections a user can make in filing a tax return). In addition, service providers often host online forums or communities where users can post questions, comments, and guides related to the features, use, or purpose of an online service, as well as respond to questions or comment on posts submitted by other users. For popular applications and services, user generated content can become a significant source of information and insight about a software application and related topics.

SUMMARY

One embodiment presented herein includes a method for dynamically personalizing application content of a software application presented to a user, in real-time, based on voice-of-customer feedback. This method may generally include presenting a first selection of application content to a user and receiving feedback from the user characterizing the first selection of application content. This method may also include evaluating the received feedback to identify at least a first topic referenced in the received feedback and determining one or more keywords associated with the first topic. This method may also include identifying a second selection of application content based on the determined one or more keywords associated with the first topic and presenting the second selection of application content to the user.

In one aspect, the received feedback is evaluated using a probabilistic topic model (e.g., a Latent Dirichlet Allocation (LDA) model) generated from a content repository associated with the software application. The first and second selections of application content may have been selected from the content repository. The content repository may include content items such as help articles, user guides, feature documentation, as well as forum posts or other content items published to an online community of users. The content repository may also include references to functions, workflows, or features of the applications accessible to the user.

Additional embodiments include a system having a processor and a memory storing one or more application programs configured to perform the methods disclosed herein and a computer-readable storage medium storing instructions, which when executed on a processor perform the methods disclosed herein.

BRIEF DESCRIPTION OF THE DRAWINGS

FIG. 4C illustrates an example interface presenting search results personalized based on the voice-of-customer feedback first shown in FIG. 4B, according to one embodiment.

DETAILED DESCRIPTION

Embodiments presented herein provide techniques for personalizing software, software interfaces, and information content based on user feedback characterizing the usefulness or helpfulness software interfaces or information content—sometimes referred to as "voice-of-customer" feedback.

More specifically, embodiments presented herein evaluate voice-of-customer feedback, in real-time, to improve the information content or software interfaces presented to a user.

For example, software applications often include a search feature used to search help content, guides, and documentation. Similarly, many online services allow users to search user generated content (e.g., forum posts or question and answer exchanges provided by other users). However, users often overestimate the capability of a search feature to correctly identify content related to what a user is looking for based on a few general keywords. As a result, users often invest little effort in writing a search query and get confused or disappointed by the content of search results. Frequently, e.g., the results include content which use the keywords from the initial search query but are not generally directed to the subject matter or topics a user was actually interested in obtaining.

At the same time, users are often willing to provide more detailed feedback about their experience interacting with a software application or online service, particularly when dissatisfied with their experience in doing so, e.g., when the system does not provide relevant help content or access to desired features in response to a user request. In one embodiment, the search feature may use this voice-of-customer feedback provided by a given user to improve the information content, software interfaces, or workflows presented to that user. For example, the application may evaluate the voice-of-customer feedback using natural language processing to identify one or more topics referenced in the voice-of-customer feedback. Provided that one of the topics is related to the features, capabilities, or use of the application or service (as opposed to, e.g., feedback that simply criticizes an application or service), then the identified topics may be used to help find content items (e.g., help content, guides, forum posts, etc.) or launch application services or features (e.g., a document preparation workflow directed to a particular topic) that are more relevant to what the user was expecting to find using the initial search.

For example, assume a user accessing on an online tax-preparation service uses an interface of the service to search for help content, user guides, or forum posts related to a particular topic (e.g., the requirements needed to qualify for a given tax credit). To do so, the user may specify keywords for an initial search. In turn, the online service may identify content items responsive to the search terms (e.g., that include the keywords specified by the user) and present a ranked list of such content items to the user. In one embodiment, the interface presenting the search results includes a graphical interface component which allows the user to specify whether the search results were relevant or helpful. If the user indicates the results were not relevant or unhelpful, the search feature may prompt the user to explain what was missing or how the results failed to provide what they were actually looking for.

In one embodiment, the resulting negative feedback may be evaluated using a probabilistic topic model (e.g. a Latent Dirichlet Allocation (LDA) model). The LDA model may have been trained over the same content repository evaluated by the search feature (e.g., the repository of help content, guides, forum posts, etc. hosted by the tax-preparation service). In addition to documents from the content repository, the training data may also include a collection of voice-of-customer feedback that does not directly reference topics in the content repository (e.g., feedback simply criticizing the online service). Doing so allows the resulting LDA model to identify topics in voice-of-customer feedback that should not be used to enhance the second search.

Once trained, the probabilistic topic model may evaluate the voice-of-customer feedback to identify a set of topics referenced by the voice-of-customer feedback and metadata for each topic. The metadata may provide a probability (or measure of confidence) that a given topic is actually referenced in the feedback and a set of keywords representing the given topic.

Provided the topic model identifies at least a first topic in the voice-of-customer feedback which is (i) related to the content, function, or features of the tax-preparation service, and (ii) has a probability or confidence that exceeds a minimum threshold, keywords associated with the first topic may be used to enhance the initial search. In one embodiment, e.g., keywords associated with the first topic are added to the initial search and a second search is performed using the enhanced search query.

Given that the feedback may provide a better description of what the user was looking for and that the topic keywords are chosen to strongly correlate to documents in the content repository associated with the topic, the results of the second search may have a substantially better chance of including content items that are relevant or useful to the user. Similarly, the second search may also better identify features of the application or workflows related to the topics identified in the voice-of-customer feedback. Enhancing the initial search based on the voice-of-customer feedback improves the quality of the search results in real-time while the user is still engaged with the application. That is, voice-of-customer feedback describing a poor user experience is used in real-time to ameliorate that poor user experience.

Note, embodiments of the disclosure are described herein using an online tax-preparation service and related online user communities as an example of computer software, software interfaces, and content that may be personalized in real-time based on voice-of-customer feedback. Of course, one of ordinary skill in the art will recognize that the approaches for personalizing software based on real time tracking of voice-of-customer feedback may be adapted for use by a broad variety of software applications, online or web services, and software features.

Figure 1:
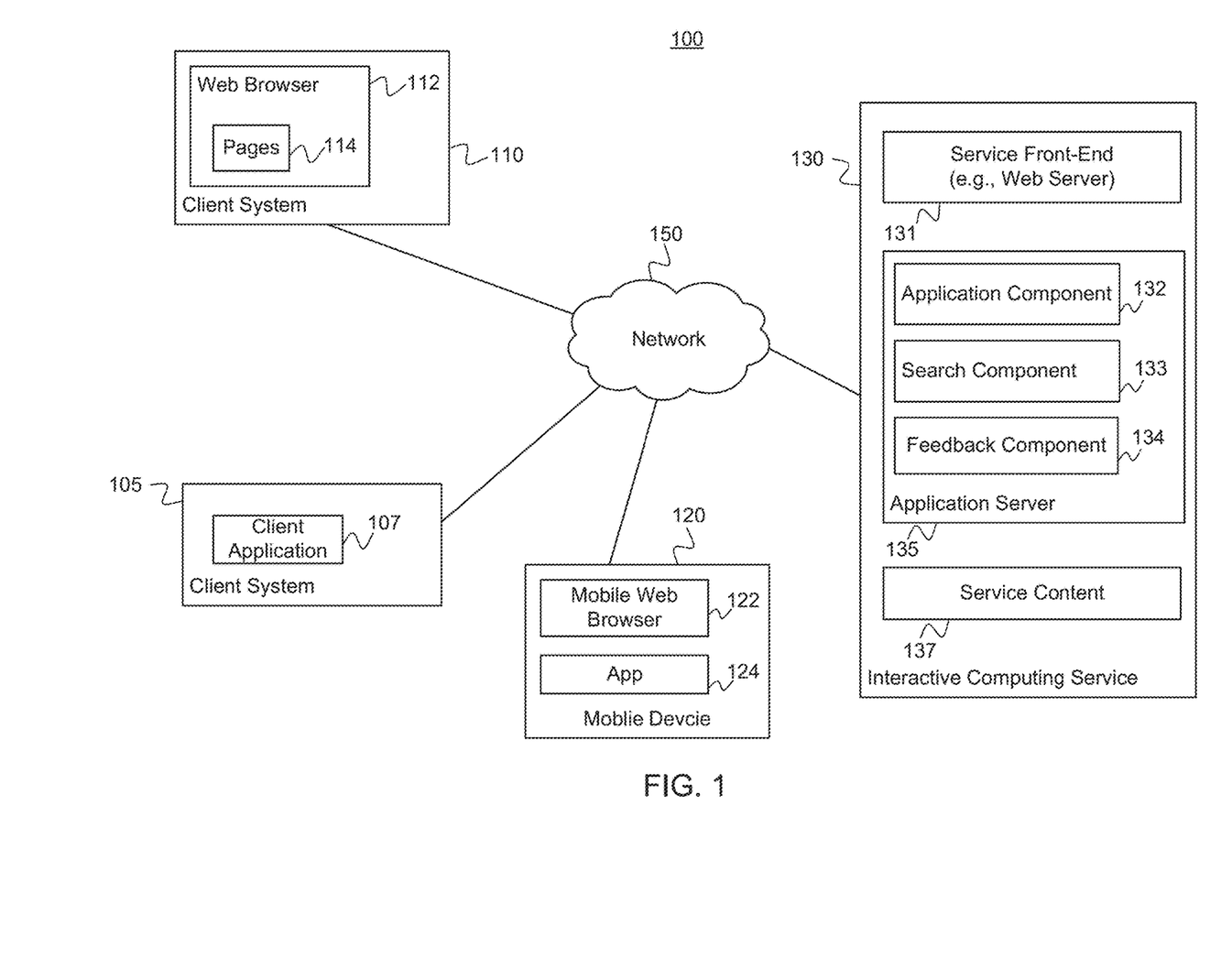
FIG. 1 illustrates an example of a computing environment used to provide an interactive computing service personalized in real-time based on voice-of-customer feedback, according to one embodiment.

FIG. 1 illustrates an example of a computing environment 100 used to provide an interactive computing service 130 personalized in real-time based on voice-of-customer feedback, according to one embodiment. As shown, the computing environment includes client systems 105, 110, a mobile device 120, and an interactive computing service 130, which are each connected to a network 150 (e.g., the internet).

Client systems 105, 110 are included to be representative of a general purpose computing system, such as a desktop or laptop computer hosting applications used to access the interactive computing service 130. For example, client system 110 includes web browser 112 used to access the interactive computing service 130 by rendering web pages 114 received from the interactive computing service 130. Similarly, client system 105 includes a client application 107. The client application 107 is included to be representative of a component of a client server application (or other distributed application) which can communicate with the interactive computing service 130 over network 150. Client application 107 may be a "thin" client where the processing is largely directed by the client application 107, but performed by computing systems of the interactive computing service 130 or a conventional software application installed on client system 105. Mobile device 120 is included to be representative of a variety of computing devices, such as a mobile telephone or computing tablet. As shown, the mobile device 120 may access the interactive computing service 130 over network 150 using a mobile web browser 122 or local application or "app" 124 executed on the mobile device 120.

In one embodiment, web browsers 112, 122, client application 107, and app 124 communicate with the interactive computing service 130. For example, in the case where interactive computing service 130 offers a tax-preparation service, web browsers 112, 122, client application 107, and app 124 may provide software which guides a user through preparing a tax return as well as provide users with access to a variety of related features available from the interactive computing service 130. Continuing with the tax preparation example, such features may include the ability to file a prepared return, to search for help content related to features of the tax-preparation service, to search posts, guides, and documentation related to tax topics, to post questions and answers to questions about the service using an online community, or to provide feedback about the usefulness, quality, or relevance of content provided by the interactive application or members of the online community. As described herein, in one embodiment, voice-of-customer feedback characterizing a user experience may be used to personalize content or features presented on web browsers 112, 122, client application 107, or app 124, in real-time, in order to improve the quality of user experience.

As shown, the interactive computing service 130 includes a service front-end 131, an application server 135, and a service content database 137. In this example, the interactive computing service is generally modeled as a web server (i.e., service front-end 131), an application server 135, and a database (i.e., service content database 137). Of course, other software architectures or distributed application frameworks could be used. Service front-end 131 and application server 135 are included to be representative of physical computing systems, as well as representative of virtual machine instances deployed to a computing cloud. Service front-end 131 may communicate with application server 135 to respond to requests from applications on client systems 105, 110, and mobile device 120.

As shown, the application server 135 includes an application component 132, search component 133, and feedback component 134. Continuing with the example of a tax preparation service, the application component 132 may provide one or more software applications which are used to guide a user in preparing a tax return and to access related features and services, e.g., to file a completed tax return or to interact with help content or interact with an online community of other users. In one embodiment, e.g., the application component 132 may respond to requests from clients by generating HTML components that can be passed to a client and rendered as a user interface (e.g., forms, text fields, and so on, along with scripts or applets executed by a client browser). In other cases, the application running on the client could generate user interface content to present data retrieved from the application server 135. Generally, the application component 132 may be implemented using any suitable software programming language, application framework, web service solution stack, virtual application containers, etc., in order to present application features and content to a user.

The search component 133 may allow users to search for content or features available from the interactive computing service 130. For example, the search component 133 may evaluate service content database 137 to identify content responsive to a user query. In such a case, the search component 133 could identify a variety of content or services hosted on the interactive computing service 130, such as help content, user guides, feature documentation, as well as user generated content such as questions posed to an online community of users, user blogs, or syndicated forum posts, etc.

The feedback component 134 may be used to capture voice-of-customer feedback regarding user experience. For example, a user presented with search results found to be unhelpful may be prompted to describe why the results were not useful or what content was missing. In turn, such voice-of-customer feedback may be evaluated using natural language processing techniques to identify what topics are referenced in the voice-of-customer feedback. In one embodiment, such feedback may be used to enhance or improve the user experience. For example, in the case of a search for content posted to an online community (e.g., tax questions and answers posted by users of an online tax preparation service), voice-of-customer feedback may be used to determine one or more keywords that should produce more relevant results for the user. Similarly, in the case of application services or features, the enhanced feedback may help identify workflows, modules, or features of the interactive computing service 130 that are relevant to a given user.

Figure 2:
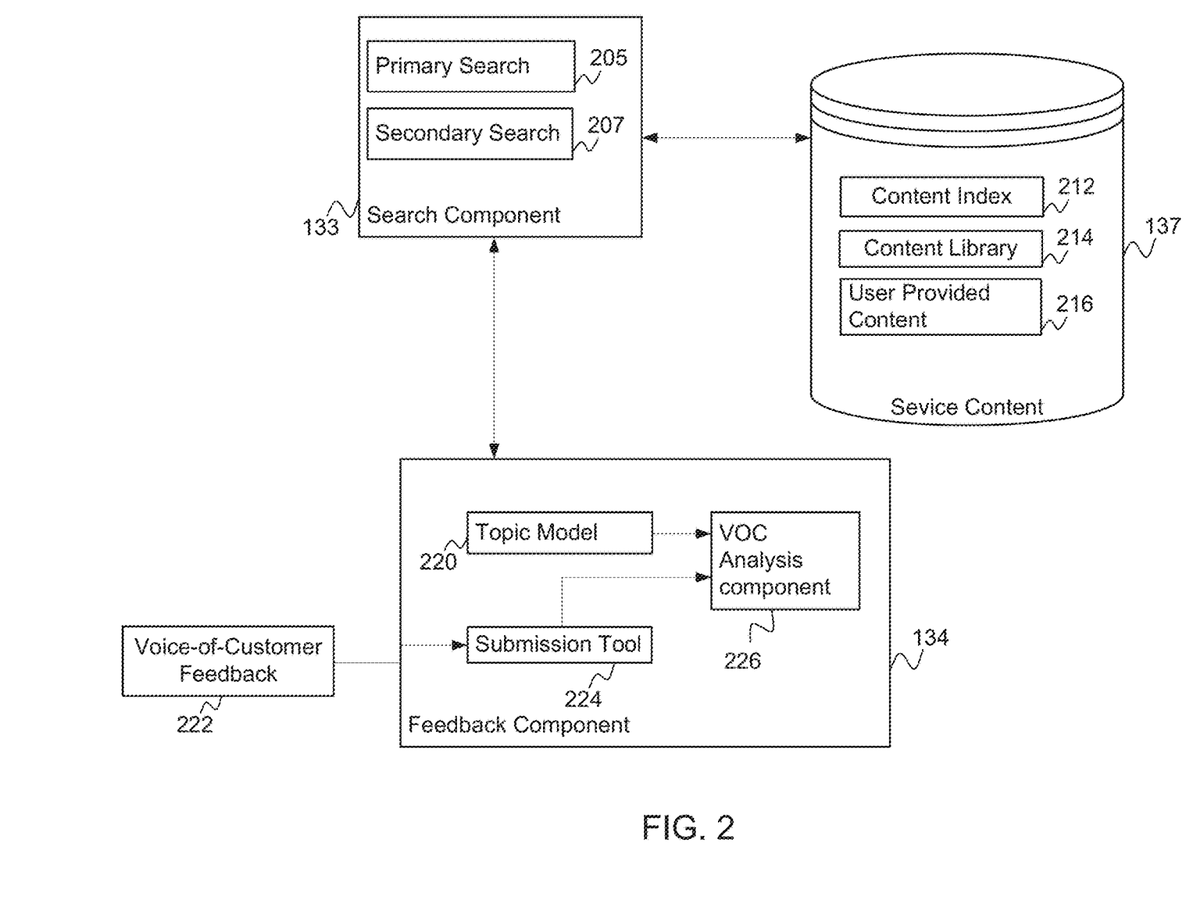
FIG. 2 illustrates components of the interactive computing service used to analyze voice-of-customer feedback in real-time, according to one embodiment.

FIG. 2 further illustrates components of the interactive computing service 130 shown in FIG. 1, according to one embodiment. As shown, the search component 133 interacts with service content database 137 and feedback component 134 to analyze voice-of-customer feedback 222 in real-time. Illustratively, the search component 133 stores a primary search 205 and a secondary search 207. The primary search 205 may include a set of keywords provided by a user. To evaluate the primary search 205, the search component 133 may identify items in content library 214 and user generated content repository 216 that include the keywords listed in the primary search 205. For example, the content index 212 may provide a mapping from individual keywords to items stored in the service content database 137. In addition, the content index 212 may map certain terms or keywords to features or workflows of an application. For example, in addition to identifying documents which include the phrase "earned income tax credit," the index 212 could also map this phrase to a workflow of the tax preparation service used to determine a given user's eligibility for this tax credit.

As shown, the feedback component 134 includes a topic model 220, a submission tool 224, and a voice-of-customer (VOC) analysis component 226. As noted, the, search component 133 allows a user to "downvote" or otherwise indicate that the results of the primary search 205 are not useful or related to what the user was actually looking for or trying to accomplish, i.e., the user can indicate a poor user experience. In one embodiment, the feedback component 134 may respond to a "downvote" by prompting the user to provide voice-of-customer feedback 222 via the submission tool 224 describing why the results of the primary search 205 were not helpful.

Once received, the submission tool 224 may evaluate the voice-of-customer feedback 222 using the VOC analysis component 226 and the topic model 220. The topic model 220 provides a statistical model which can identify a set of topics referenced in the voice-of-customer feedback 222 (and a relative measure of how much of the feedback may be about a given topic). That is, the feedback could be predicted to be 80% related to a tax filing status and 20% related to another topic. The topic model may be generated by "learning" a set of topics referenced in documents stored in service content database 137. Generally, a "topic" may be represented as a cluster of words that occur together frequently in documents in the service content database 137. The label for a topic may be assigned by a subject matter expert or selected as one of the keywords in a given topic. In a particular embodiment, topic model 220 is a Latent Dirichlet Allocation (LDA) model generated from the service content database 137. Of course, other probabilistic topic models may be used. Additionally, as the documents or other information in service content database 137 changes over time, the topic model 220 may be regenerated at times determined by the service provider.

In one embodiment, the VOC analysis component 226 evaluates the voice-of-customer feedback 222 relative to the topic model 220 to identify a set of one or more topics believed to be referenced in the voice-of-customer feedback 222. Provided the VOC analysis component 226 identifies a topic in the voice-of-customer feedback 222 related to the software application or service (e.g., interactive computing service 130), keywords associated with that topic may be used to enhance the primary search 205. That is, as an LDA topic model generally defines a topic as a cluster of words representative of a given topic, the keywords associated with a topic may be added to the primary search 205 to generate secondary search 207. The secondary search 207 may be executed to find documents (or other content) in the service content database 137.

Figure 3:
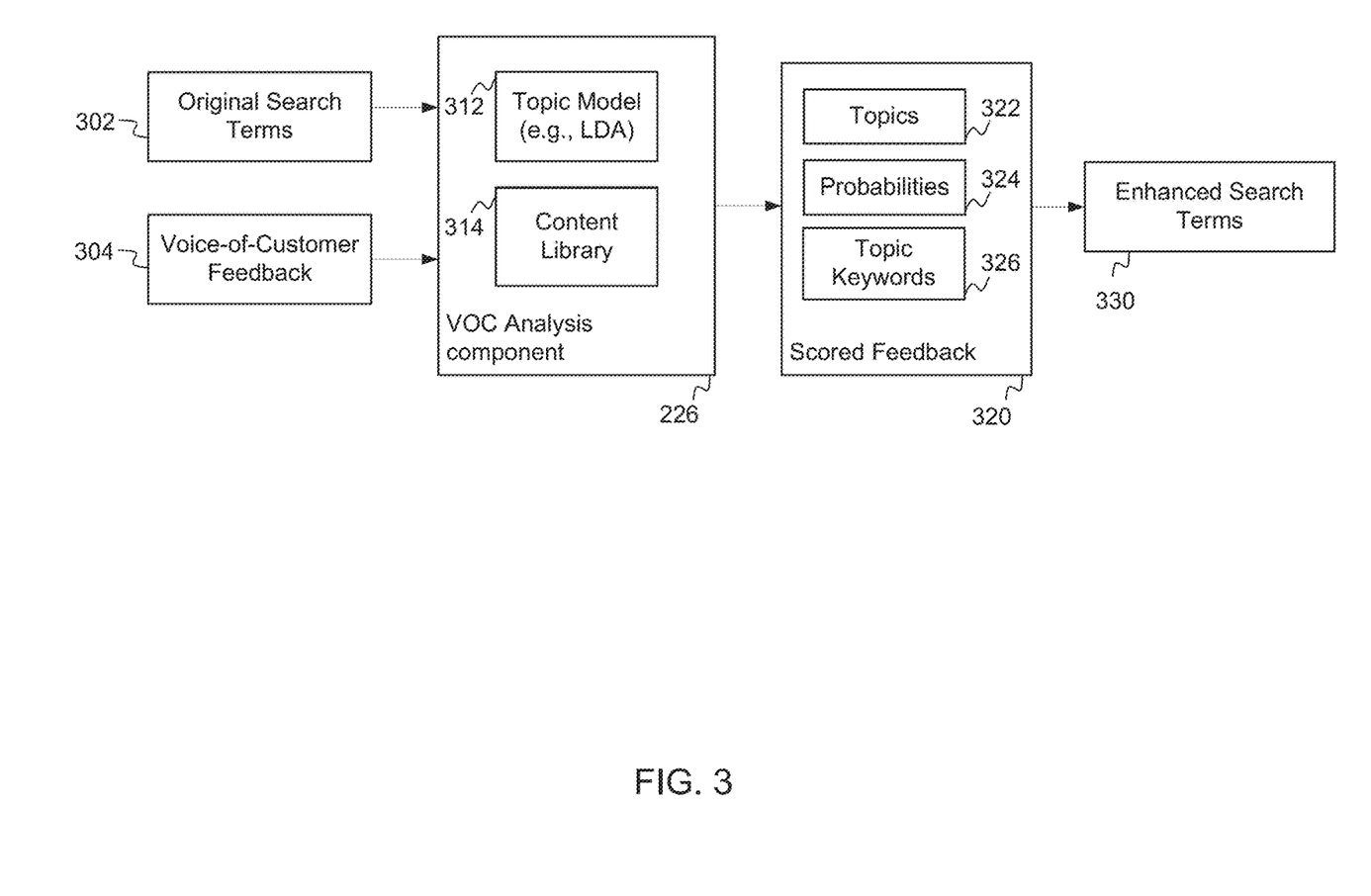
FIG. 3 illustrates a probabilistic topic model used to identify topics and related keywords which can be used to enhance a set of initial search keywords, according to one embodiment.

FIG. 3 further illustrates an LDA topic model 312 used to identify topics and related keywords which can be used to enhance a set of original search terms 302, according to one embodiment. As shown, the VOC analysis component 226 includes an LDA topic model 312 generated from a content library 314. The original search terms 302 and voice-of-customer feedback 304 are passed to the VOC analysis component 226. In turn, the VOC analysis component 226 generates scored feedback 320 identifying one or more topics determined to be present in the voice-of-customer feedback 304 along with related metadata about each identified topic. In one embodiment, the VOC analysis component 226 evaluates only the content of the voice-of-customer feedback 304. Alternatively, however, the VOC analysis component 226 may combine the original search terms 302 and voice-of-customer feedback 304 in order to generate scored feedback 320 (e.g., topics, probabilities, and keywords) based on the content of both the voice-of-customer feedback 304 and the original search terms 302.

The scored feedback 320 generally corresponds to the results of the evaluation made by the VOC analysis component 226. In one embodiment, the scored feedback 320 may be formatted using a machine readable format (e.g., JSON). The scored feedback 320 may include a set of topics 322, probabilities 324, and dynamically generated topic keywords 326. In one embodiment, the topics 322 specify identifiers corresponding to the most predominantly referenced topics in the voice-of-customer feedback 304 (and optionally the original search terms 302). That is, the scored feedback 320 identifies what percentage of the voice-of-customer feedback 304 is attributable to or associated with a given topic 322 referenced in the voice-of-customer feedback 304. In addition to a proportional distribution of topics, the probabilities 324 indicate a measure of confidence regarding how likely it is a given topic is in fact referenced in the voice-of-customer feedback 304.

The topic keywords 326 generally provide a selection of terms based on the topics 322. For example, topic keywords 326 may be selected from the keywords in the LDA topic model 312 based on the proportional distribution of relevant topics 322 identified in the voice-of-customer feedback 204. Once selected, the topic keywords 326 may be used to generate enhanced search terms 330. For example, the enhanced search terms 330 may include the original search terms 302 and the topic keywords 326 for topics in the voice-of-customer feedback 304 that have a minimum proportional distribution and probability 324. That is, keywords may need to be "about" a given topic to a specified minimum degree and the given topic may need to have a probability of being referenced above a specified threshold before topic keywords 326 associated with that topic are included in the enhanced search terms 330. The thresholds for the minimum proportional distribution and probability 324 may generally be set as a matter of preference. Once generated, the enhanced search terms 330 may be used to identify search results that should be more helpful or relevant for the user supplying the original search terms 302.

Figure 4A:
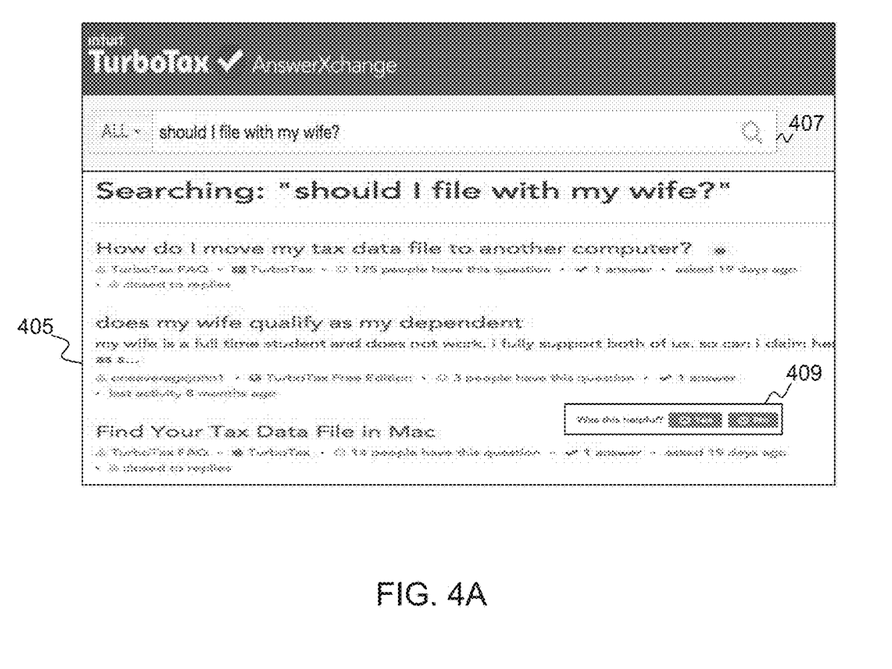
FIGS. 4A-4B illustrate interfaces presenting an initial set of search results along with a mechanism for providing voice-of-customer feedback related to the usefulness of the search results, according to one embodiment.
Figure 4B:
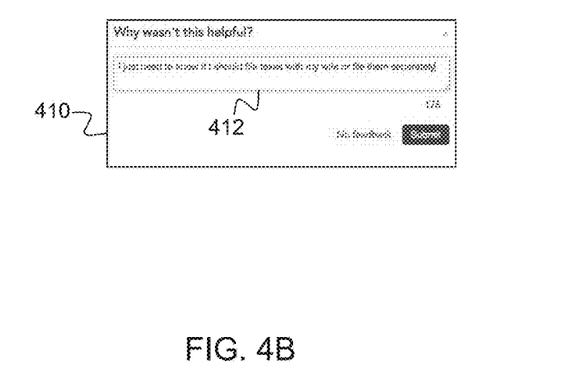

FIGS. 4A-4C illustrate an example of the VOC analysis component discussed above being used to generate enhanced search terms from voice-of-customer feedback, according to one embodiment. In particular, the examples illustrated in FIGS. 4A-4C show a user interacting with a search feature of an online tax-preparation service. First, FIGS. 4A-4B illustrate interfaces presenting an initial set of search results along with a mechanism for providing voice-of-customer feedback related to the usefulness of the search results.

FIG. 4A shows an interface 405 which includes a text input field 407 used to specify search terms for searching a content repository. In this example, a user has specified an initial search phrase: "should I file with my wife?" and the interface 405 shows the three top-ranked search results identified using the initial search phrase. The first result is an item from a list of "frequently asked questions" (FAQ) titled: "How do I move my tax data file to another computer?" In this example, the FAQ item may have been included in the search results based on the matching term "file" in the initial search phrase and the title of the FAQ item.

Interface 405 also includes a feedback button 409 allowing a user to specify whether the results presented in interface 405 were helpful. As shown, a user can provide feedback regarding the search results by clicking a "yes" button or a "no" button. In one embodiment, if the user selects "no" (indicating the results are not helpful) the search feature may present the dialog box shown in FIG. 4B, prompting the user to provide voice-of-customer feedback. Illustratively, the dialog box 410 asks the user to specify: "Why wasn't this helpful?" and in response, the user has provided a description in text field 412 generally indicating that they were looking for advice about whether to file a joint tax return with a spouse or file individual returns. Given this additional information, the meaning of the initial search phrase "should I file with my wife?" is more clear.

In one embodiment, an LDA topic model may be used to identify what topics are referenced by the voice-of-customer feedback in text field 412 and, from the identified topics, a set of representative keywords used by documents in the content repository that reference a given topic. Assume for this example that the LDA topic model identifies a predominant topic of "filing status" from the voice-of-customer feedback and that the VOC analysis component selects keywords from this topic of "married," "jointly," "file," and "filing status." After adding these terms to the initial search phrase, a second search of the content repository may be performed.

FIG. 4C illustrates an example interface 450 presenting search results personalized based on the voice-of-customer feedback shown in FIG. 4B. As shown, the top search result in interface 450 is a FAQ entry titled: "Is it better for a married couple to file jointly or separately?" And the second and third results are also directed to the subject matter sought by the user; namely, how to select a filing status. As this example illustrates, using the enhanced search terms determined from the voice-of-customer feedback may improve the relevancy or usefulness of search results presented to a user. In this example, the search results in interface 450 include a content item from a service provider FAQ and two user generated content items posting answers to questions of other users on the topic of filing status.

In addition to including user generated content items or application documentation, in one embodiment, the search results could also include workflows or features provided by the interactive computing service that are relevant to the user's inquiry (as determined based on the topics identified in the voice-of-customer feedback). In the example of FIG. 4C, the search results could also include links to a calculator or workflow the user could interact with to understand the requirements or consequences of filing jointly or separately as well as links to a tax preparation workflow to begin preparing a joint (or individual) return.

Figure 5:
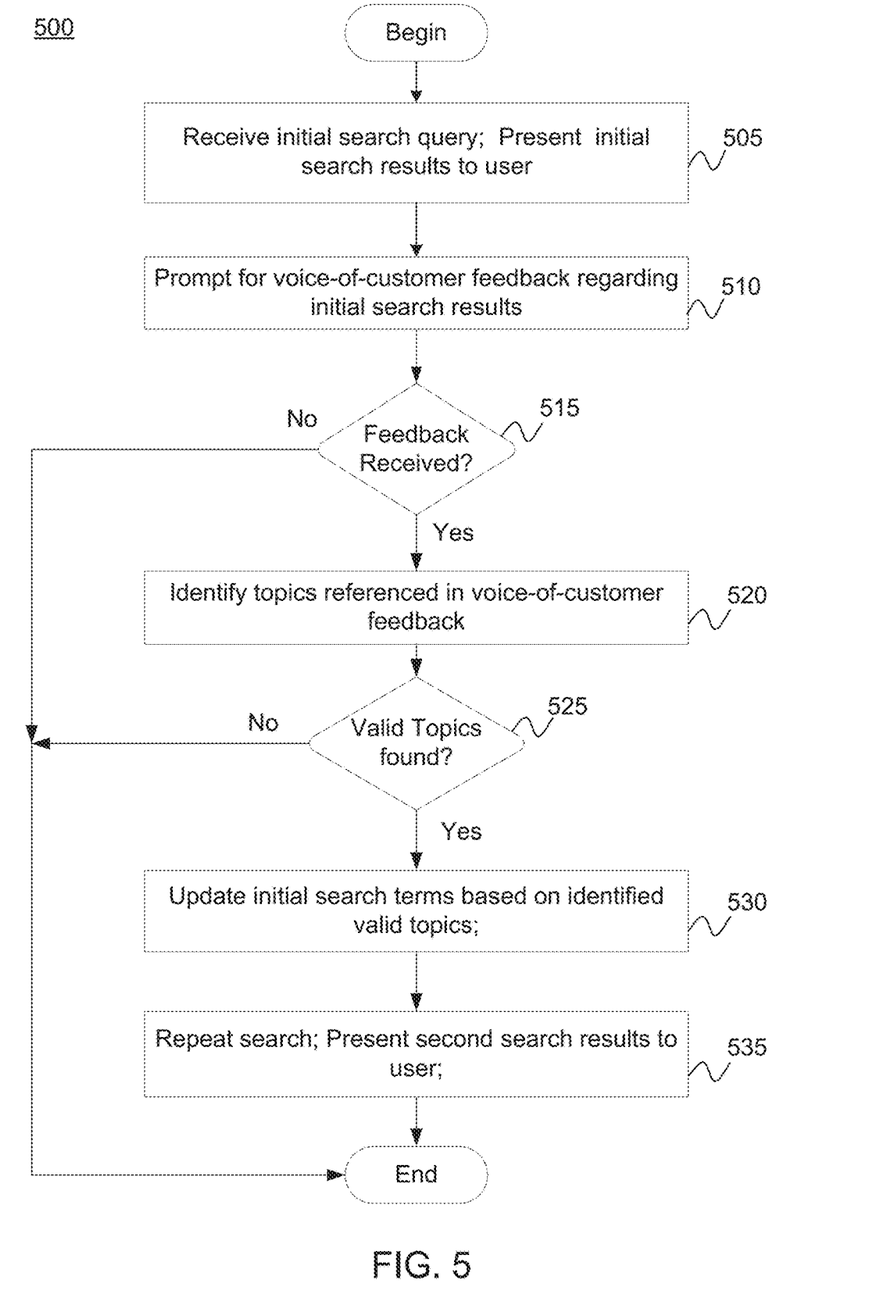
FIG. 5 illustrates a method for personalizing software based on real-time analysis of voice-of-customer feedback, according to one embodiment.

FIG. 5 illustrates a method 500 for personalizing software based on real-time analysis of voice-of-customer feedback, according to one embodiment. As shown, the method 500 begins at step 505 where the software receives an initial search query or other request from a user. For example, as shown in FIG. 4A, a user may enter a set of keywords used to search for documents in a content repository. In other cases, a user could interact with a "wizard" or guided feature presentation component to identify documents, software features, tools, components, or workflows included in the application. In response, the software identifies an initial selection of application content to present to the user, e.g., a set of documents or application components believed to be responsive to the initial user request.

At step 510, the application prompts for feedback regarding the initial selection of application content presented in the search results. For example, the search results may include interface components used to "upvote" or "downvote" the results. In cases where the user indicates the initial search results are not relevant or are otherwise unhelpful, the software may launch a feedback interface allowing the user to provide a detailed description about their user experience. In another case, the search results could include a link used to launch a feedback interface. At step 515, if the user does not provide any voice-of-customer feedback, the method ends. Otherwise, in cases where the user does interact with the feedback interface, at step 520, the software may evaluate the voice-of-customer feedback using a probabilistic topic model to identify one or more topics referenced in the voice-of-customer feedback. For example, in one embodiment, the LDA topic model may be generated from the documents and other content in the content repository. The resulting LDA topic model is used to identify topics referenced in the voice-of-customer feedback along with metadata characterizing each topic. As described above, the metadata may identify a probability or measure of confidence that the feedback references a given topic. Further, in one embodiment, the topics may be ranked in order of how predominantly each topic is discussed in the voice-of-customer feedback (e.g., each topic may be assigned a relative percentage of how much that topic is discussed in the voice-of-customer feedback).

At step 525, the application determines whether the LDA topic model identified any relevant topics in the feedback. In some cases, the voice-of-customer feedback may not provide additional description about what the user was trying to find, e.g., where unstructured text supplied by a user indicates the search results "were not what I was looking for." Further, the application may require the LDA topic model to predict that the feedback is predominantly about a given topic and that the probability assigned by the LDA topic model exceeds a specified threshold before a topic is found to be valid. Doing so prevents low-probability topics or topics that are only tangentially referenced in the feedback from being used to enhance the initial search. That is, when voice-of-customer feedback references multiple topics, the system may be configured to select most predominately discussed topics in the voice-of-customer feedback to enhance the initial search. If no valid topics are identified by the LDA topic model (step 525), the method ends.

Otherwise, at step 530, the application may dynamically determine a set of keywords to use to enhance the initial search. For example, as the LDA topic model generally represents topics in the content repository as clusters of words that occur together frequently in documents about a given topic, the keywords may be selected as terms in the documents that most frequently appear or co-appear, etc. Further, if two (or more) valid topics are identified in the feedback, terms which co-occur in both topics could be favored for selection. Of course, one of ordinary skill in the art will recognize that keywords may be selected from the LDA topic model using a variety of selection criteria.

In one embodiment, the keywords are added to the initial search query received at step 505. At step 535, a second search is performed using the enhanced search query. Assuming the LDA topic model correctly identifies topics referenced in the voice-of-customer feedback, then the keywords added to the second search should more accurately identify content from the content repository the user was seeking or features of the application the user was attempting to access.

Figure 6:
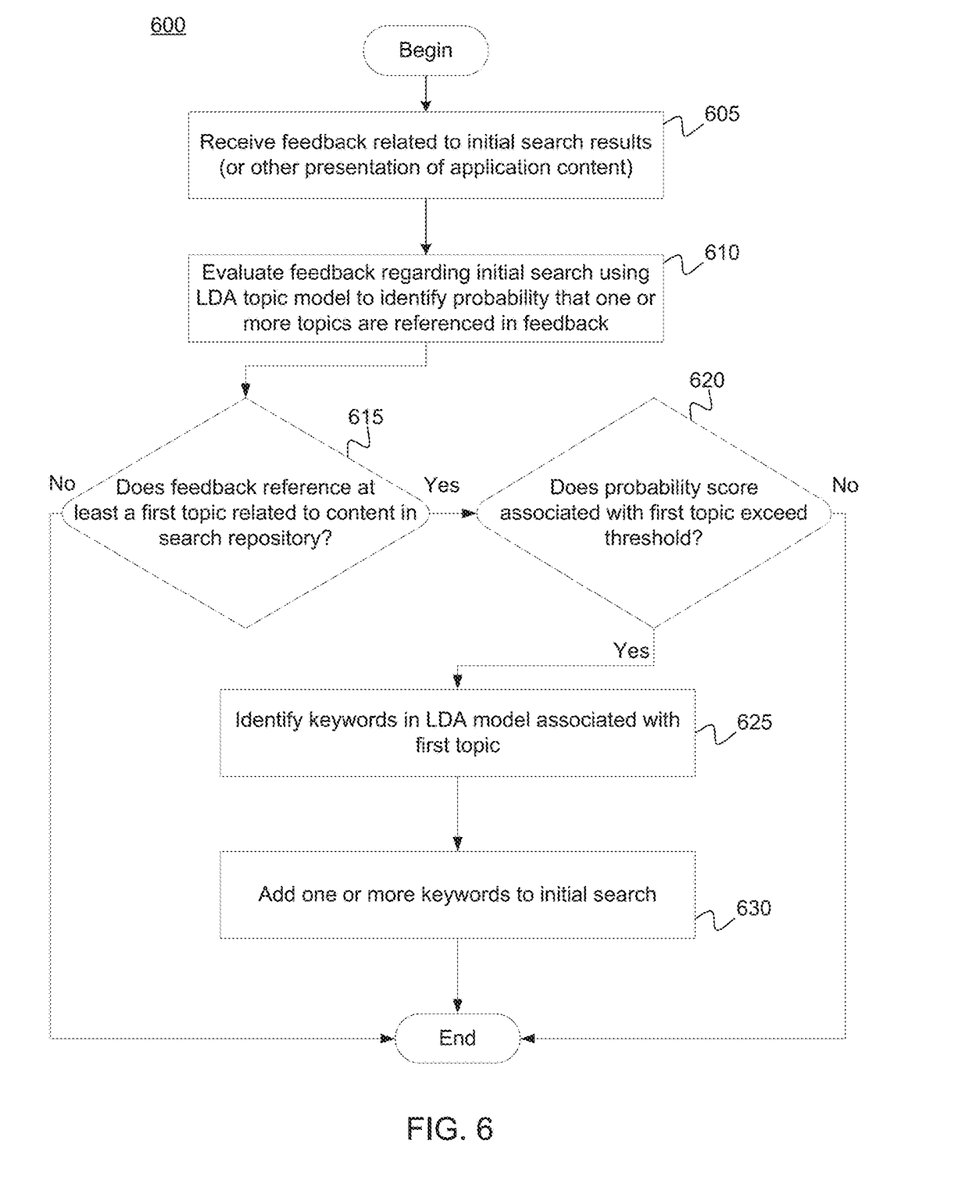
FIG. 6 illustrates a method for identifying relevant topics along with related metadata and keywords using real-time analysis of voice-of-customer feedback, according to one embodiment.

FIG. 6 illustrates a method 600 for identifying relevant topics along with related metadata and keywords using real-time analysis of voice-of-customer feedback, according to one embodiment. As shown, the method 600 begins at step 605 where the application (e.g., an online tax-preparation service) receives voice-of-customer feedback related to an initial set of search results or other presentation of application content (e.g., a list of application workflows related to topics identified using the initial search terms).

At step 610, the application evaluates the feedback regarding the initial search results using a probabilistic topic model (e.g., an LDA topic model) to identify one or more topics referenced in the voice-of-customer feedback. At steps 615 and 620, the application determines whether any topics identified in the search results may be used to enhance the initial search. As shown, at step 615, the application determines if the feedback is sufficiently about at least a first topic that is related to content in the search repository. For example, the topics may be ranked relative to one another as to how "much" the feedback is about a given topic. At step 620, the application determines if a first topic (which satisfies step 615) has an associated probability that exceeds a specified threshold. Steps 615 and 620 may prevent topics which are either referenced only tangentially in the voice-of-customer feedback or which the model assigns a low measure of confidence (or both) from being used to enhance the search results. If no topic satisfies the tests of steps 615 and 620, then the method ends. Otherwise, the application identifies keywords in the LDA topic model associated with the valid topics (step 625) and adds one or more keywords to the initial search (step 630). As described above, enhancing the initial search with topic keywords may substantially improve the relevance or quality of search results presented to the user.

Figure 7:
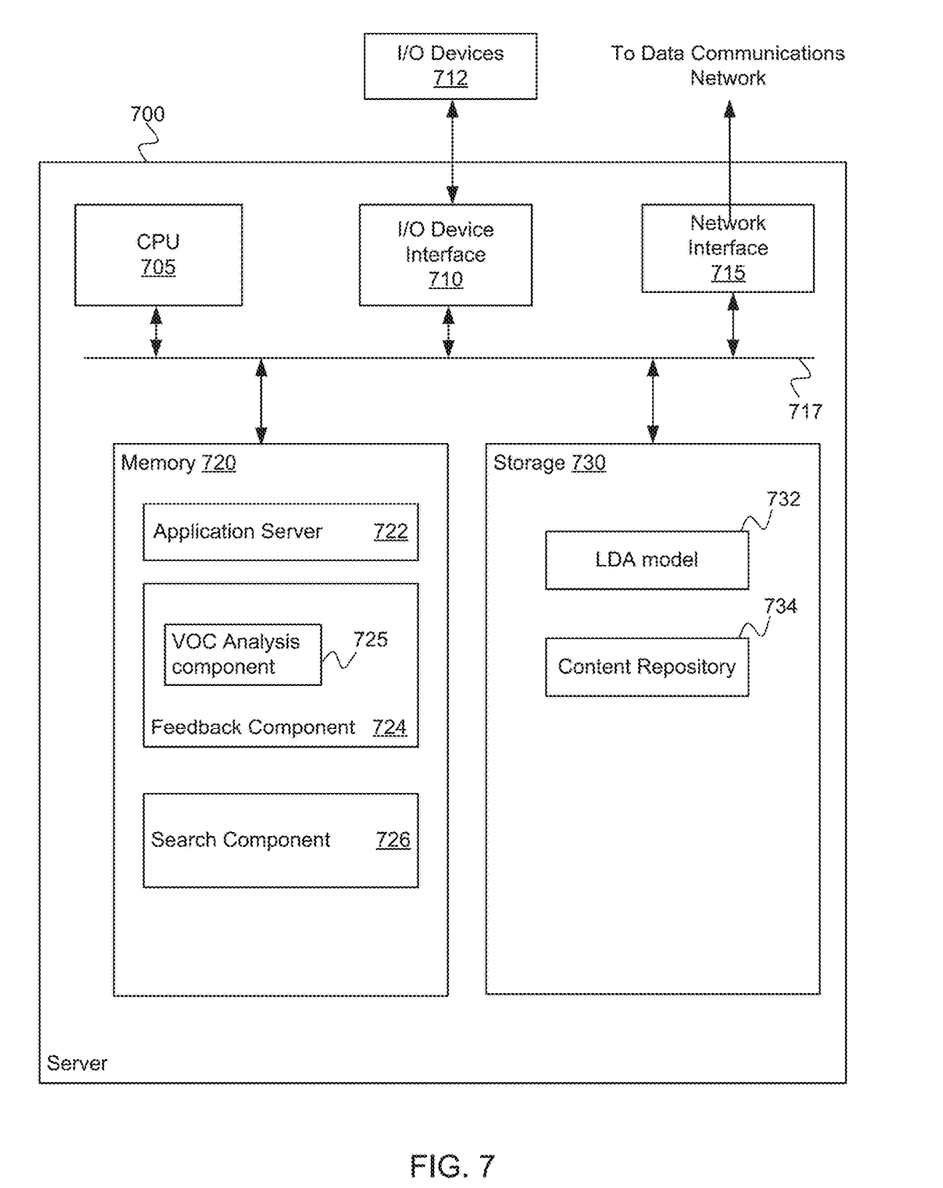
FIG. 7 illustrates an example computing system used to personalize software in real-time based on voice-of-customer feedback, according to one embodiment.

FIG. 7 illustrates an example computing system 700 used to personalize software in real-time based on voice-of-customer feedback, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stored in the storage 730. The bus 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an application server 722, a feedback component 724 and a search component 726. And storage 730 includes an LDA topic model 732 and a content repository 734. As described, the application server 722 provides the underlying logic and functionality for an application accessed by users, e.g., an online interactive tax-preparation service. The application server 722 may also provide users with access to content and features associated with the online interactive service, such as the hosting of online communities or forums where users can post and respond to questions, topics, and comments about the application or online service. The search component 726 may be used to search for content in the content repository 734 (e.g., search the question/answer exchange forum of an online community) as well as to search for service documentation regarding features or workflows supported by the online interactive service. As noted, users may compose a search query by specifying a set of keywords or phrases.

Feedback component 724 may be used to enhance a search query based on feedback describing the usefulness or quality of an initial search result; particularly based on negative feedback describing what was missing or lacking in the initial search results. As noted, users are often willing to provide more detailed feedback about their experience interacting with a software application or online service, particularly when dissatisfied with their experience in doing so or when the system does not provide relevant help content or access to desired features in response to a user request. In one embodiment, this voice-of-customer feedback may be evaluated using VOC analysis component 725. As described, the VOC analysis component 725 may use LDA topic model 732 to identify topics referenced by the voice-of-customer feedback and associated topic metadata. In one embodiment, keywords representing one or more topics referenced in the feedback may be used to enhance the initial search query composed by a user.

Advantageously, enhancing the initial search based on the voice-of-customer feedback improves the quality of the search results in real-time while the user is still engaged with the application. That is, voice-of-customer feedback describing a poor user experience is used in real-time to ameliorate that poor user experience.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for dynamically personalizing application content of a software application presented to a user based on usefulness feedback, comprising:
   receiving, from a user, a first search query related to application content of the software application;
   searching one or more content repositories associated with the software application for a first selection of application content based on the first search query;
   presenting the first selection of application content to the user; and
   while the user is interacting with the software application:
      presenting, to the user, a prompt for usefulness feedback from the user;
      receiving the usefulness feedback from the user, wherein the usefulness feedback indicates a user opinion of the usefulness of the first selection of application content;
      evaluating the received usefulness feedback to identify at least a first topic referenced in the received usefulness feedback;
      determining one or more keywords associated with the first topic;
      searching the one or more content repositories associated with the software application for a second selection of application content based on one or more keywords identified in the first search query and the determined one or more keywords associated with the first topic, wherein the second selection of application content comprises information including one or more topics missing in the first selection of application content; and
      presenting the second selection of application content to the user.

2. A computer-readable storage medium storing instructions, which when executed on a processor, perform an operation for dynamically personalizing application content of a software application presented to a user based on usefulness feedback, the operation comprising:
   receiving, from a user, a first search query related to application content of the software application;
   searching one or more content repositories associated with the software application for a first selection of application content based on the first search query;
   presenting the first selection of application content to the user; and
   while the user is interacting with the software application:
      presenting, to the user, a prompt for usefulness feedback from the user;
      receiving the usefulness feedback from the user, wherein the usefulness feedback indicates a user opinion of the usefulness of the first selection of application content;
      evaluating the received usefulness feedback to identify at least a first topic referenced in the received usefulness feedback;
      determining one or more keywords associated with the first topic;
      searching the one or more content repositories associated with the software application for a second selection of application content based on one or more keywords identified in the first search query and the determined one or more keywords associated with the first topic, wherein the second selection of application content comprises information including one or more topics missing in the first selection of application content; and
      presenting the second selection of application content to the user.

3. A system, comprising:
   a processor; and
   a memory containing a program which, when executed on the processor, performs an operation for dynamically personalizing application content of a software application presented to a user based on usefulness feedback, the operation comprising:
      receiving, from a user, a first search query related to application content of the software application,
      searching one or more content repositories associated with the software application for a first selection of application content based on the first search query;
      presenting the first selection of application content to the user, and
      while the user is interacting with the software application:
         presenting, to the user, a prompt for usefulness feedback from the user;
         receiving the usefulness feedback from the user, wherein the usefulness feedback indicates a user opinion of the usefulness of the first selection of application content;
         evaluating the received usefulness feedback to identify at least a first topic referenced in the received usefulness feedback;
         determining one or more keywords associated with the first topic;
         searching the one or more content repositories associated with the software application for a second selection of application content based on one or more keywords identified in the first search query and the determined one or more keywords associated with the first topic, wherein the second selection of application content comprises information including one or more topics missing in the first selection of application content; and
         presenting the second selection of application content to the user.

4. The computer-implemented method of claim 1, wherein the received usefulness feedback is evaluated using a probabilistic topic model generated from the one or more content repositories associated with the software application.

5. The computer-implemented method of claim 1, wherein the first search query identifies a first set of keywords.

6. The computer-implemented method of claim 1, wherein either the first or second selection of application content, or both, reference one or more application features accessible to the user.

7. The computer-implemented method of claim 1, wherein the software application comprises an online interactive service exposed to users over computer networks.

8. The method of claim 1, wherein determining one or more keywords associated with the first topic comprises determining one or more keywords associated with a topic having a probability of being referenced in the one or more content repositories above a threshold probability.

9. The computer-readable storage medium of claim 2, wherein the received usefulness feedback is evaluated using a probabilistic topic model generated from the one or more content repositories associated with the software application.

10. The computer-readable storage medium of claim 2, wherein the first search query identifies a first set of keywords.

11. The computer-readable storage medium of claim 2, wherein either the first or second selection of application content, or both, reference one or more application features accessible to the user.

12. The computer-readable storage medium of claim 2, wherein determining one or more keywords associated with the first topic comprises determining keywords associated with a topic having a probability of being referenced in the one or more content repositories above a threshold probability.

13. The system of claim 3, wherein the received usefulness feedback is evaluated using a probabilistic topic model generated from the one or more content repositories associated with the software application.

14. The system of claim 3, wherein the first search query identifies a first set of keywords.

15. The system of claim 3, wherein either the first or second selection of application content, or both, reference one or more application features accessible to the user.

16. The system of claim 3, wherein determining one or more keywords associated with the first topic comprises determining keywords associated with a topic having a probability of being referenced in the one or more content repositories above a threshold probability.

17. The computer-implemented method of claim 4, wherein the one or more content repositories include user generated content published by an online community supporting the software application.

18. The computer-implemented method of claim 4, wherein the probabilistic topic model is a Latent Dirichlet Allocation (LDA) model.

19. The computer-implemented method of claim 5, wherein searching the one or more content repositories for the second selection of application content based on the determined one or more keywords associated with the first topic comprises:
generating a second search query by adding the one or more keywords associated with the first topic to the first search query; and
performing the second search query.

20. The computer-readable storage medium of claim 9, wherein the one or more content repositories include user generated content published by an online community supporting the software application.

21. The computer-readable storage medium of claim 9, wherein the probabilistic topic model is a Latent Dirichlet Allocation (LDA) model.

22. The computer-readable storage medium of claim 10, wherein searching the one or more content repositories associated with the software application for the second selection of application content based on the determined one or more keywords associated with the first topic comprises:
generating a second search query by adding the one or more keywords associated with the first topic to the first search query; and
performing the second search query.

23. The system of claim 13, wherein the one or more content repositories include user generated content published by an online community supporting the software application.

24. The system of claim 13, wherein the probabilistic topic model is a Latent Dirichlet Allocation (LDA) model.

25. The system of claim 14, wherein searching the one or more content repositories associated with the software application for the second selection of application content based on the determined one or more keywords associated with the first topic comprises:
generating a second search query by adding the one or more keywords associated with the first topic to the first search query; and
performing the second search query.

* * * * *